(12) United States Patent
Pelenur et al.

(10) Patent No.: US 9,373,000 B1
(45) Date of Patent: *Jun. 21, 2016

(54) SELECTIVE PHYSICAL WORLD CORRELATION OF VIRTUAL WORLD INTERACTIONS

(71) Applicant: Uumbra, LLC, Dover, DE (US)

(72) Inventors: Julian Pelenur, Marblehead, MA (US); Joseph Pilkerton, Charlestown, MA (US)

(73) Assignee: Uumbra, LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/712,185

(22) Filed: May 14, 2015

Related U.S. Application Data

(63) Continuation of application No. 14/587,610, filed on Dec. 31, 2014, now Pat. No. 9,064,128.

(60) Provisional application No. 62/021,103, filed on Jul. 4, 2014.

(51) Int. Cl.
*G06F 21/00* (2013.01)
*G06F 21/62* (2013.01)

(52) U.S. Cl.
CPC ...................................... *G06F 21/62* (2013.01)

(58) Field of Classification Search
CPC ....................................................... G06F 21/62
See application file for complete search history.

(56) References Cited

U.S. PATENT DOCUMENTS

| 8,971,931 | B1 | 3/2015 | Wuellner et al. | |
|---|---|---|---|---|
| 2005/0038876 | A1* | 2/2005 | Chaudhuri | G06F 17/3087 709/219 |
| 2010/0306249 | A1* | 12/2010 | Hill | G06F 17/30867 707/769 |
| 2012/0221657 | A1* | 8/2012 | Zeevi | G06F 9/54 709/206 |
| 2013/0024576 | A1* | 1/2013 | Dishneau | H04W 4/206 709/227 |
| 2013/0079037 | A1* | 3/2013 | Dobyns | H04W 4/008 455/456.3 |
| 2013/0189962 | A1* | 7/2013 | Okolo | G06Q 10/10 455/414.1 |
| 2013/0198281 | A1* | 8/2013 | Scuba | H04L 67/18 709/204 |
| 2014/0133656 | A1* | 5/2014 | Wurster | H04L 9/0637 380/270 |

(Continued)

OTHER PUBLICATIONS

Rao, Leena, "OKCupid Integrates Location Based Dating Into IOS and Android Apps", TCTV News, Tech Crunch, Aug. 11, 2011, 1 page.

(Continued)

*Primary Examiner* — Morshed Mehedi
(74) *Attorney, Agent, or Firm* — Finch & Maloney PLLC (57) ABSTRACT

Techniques described herein relate to facilitating interaction in the physical world, after initial interaction has occurred within the virtual world, while also maintaining at least a degree of privacy, anonymity, safety, and/or deniability for the physical world parties. This may be accomplished, according to some example embodiments, by the exchange of one or more self-identifiers between virtual world personas, each of which is defined by its sending physical world party but that lacks any personal identification information associated with the sending party. Content of a self-identifier may only be known to the sending physical world party, at least until the receiving party is authorized and/or consents to view or display the self-identifier in a manner that may be perceived by the sending party. A sending party that perceives their own self-identifier, as displayed by a receiving party, may correlate the receiving party with a virtual world persona to which the self-identifier was sent.

20 Claims, 7 Drawing Sheets

(56) References Cited

U.S. PATENT DOCUMENTS

2014/0280532 A1* 9/2014 MacNiven ............ H04L 67/306
709/204
2014/0372195 A1* 12/2014 Desideri ............ G06Q 30/0227
705/14.26

OTHER PUBLICATIONS

Perez, Serah, "The Rise of the Ephemeralent", TCTV News, Tech Crunch, Jun. 30, 2013, 6 pages.
Crook, Jordan, "#Love: I'm Single, Therefore I Tinder", TCTV News, Tech Crunch, Apr. 20, 2014, 10 pages.
Reim, Garrett, "5 Things LA Can Teach the World About Messaging Apps", TCTV News, Tech Crunch, Aug. 7, 2014, 8 pages.
Perez, Sarah, "Mingleton is Tinder for Strangers in the Room With You", TCTV News, Tech Crunch, Apr. 9, 2014, 3 pages.
Lawler, Ryan, "Ultra-Hot Secret Sharing App Whisper Raises $3 Million from Lightspeed, Trinity, and Others", TCTV News, Tech Crunch, Apr. 4, 2013, 4 pages.
Dillet, Romain, "Snapchat Adds Ephemeral Text Chat and Video Calls", TCTV News, Tech Crunch, May 1, 2014, 3 pages.
Constine, Josh, "Tell All Apps Secret Adds Social Sharing and Nearby Gossip", TCTV News, Tech Crunch, Mar. 7, 2014, 5 pages.
Pea Soup for the Cynic's Soul, "The Blind Meeting", Rink Works Online Entertainment, http://www.rinkworks.com/peasoup/blind/shtml, Dec. 29, 2010, 3 pages.

* cited by examiner

SELECTIVE PHYSICAL WORLD CORRELATION OF VIRTUAL WORLD INTERACTIONS

RELATED APPLICATIONS

This application is a continuation of U.S. application Ser. No. 14/587,610, filed Dec. 31, 2014, titled "SELECT WE PHYSICAL WORLD CORRELATION OF VIRTUAL WORLD INTERACTIONS", that claims the benefit of U.S. provisional application Ser. No. 62/021,103, filed on Jul. 4, 2014 and titled "Selective Physical World Correlation of Virtual World interactions, Through A Computer Network", each of which is hereby incorporated by reference in their entirety.

RELATED ART

Online forums, online marketplaces, and online socializing websites or applications exist in which individuals or other types of parties may interact with one another for various purposes. To maintain a degree of anonymity or privacy, parties often interact with one another through virtual world personas that each party may establish online. CRAIGSLIST is an example of such a forum in which parties seeking different types of goods and services may interact. Similarly, numerous dating forums exist in which parties may identify and interact with one another through online or virtual world personas in efforts to find another party with whom to eventually interact in the physical world. OKCUPID.com is but one example of such a forum.

The applicant has appreciated that users of conventional virtual world forums are often presented with a dilemma ahead of interacting in the physical world with a party that has only been known anonymously or pseudo-anonymously through virtual world communications. Parties may be apprehensive to interact in the physical world due in part to concerns over privacy, safety, or an inability to ensure that a physical world party is the same party as the one represented in the virtual world

DETAILED DESCRIPTION

Techniques described herein relate to facilitating interaction in the physical world, after initial interaction has occurred within the virtual world, while also maintaining at least a degree of privacy, anonymity, safety, and/or deniability for the physical world parties. This may be accomplished, according to some example embodiments, by the exchange of one or more self-identifiers between virtual world personas, each of which is known by a sending physical world party but that lacks any personal identification information associated with the sending party. Content of a self-identifier may only be known to the sending physical world party, at least until the receiving party is authorized and/or consents to view or display the self-identifier in a manner that may be perceived by the sending party. A sending party that perceives their own self-identifier, as displayed by a receiving party, may correlate the receiving party with a virtual world persona to which the self-identifier was sent.

Privacy, anonymity, safety, and/or deniability may be maintained by physical world parties through the exchange of self-identifiers that include content that, at least initially, is only known to a sending party. The sending party may choose not to acknowledge their own self-identifier as displayed by a receiving party, and in this manner the sending party may be free to walk away without providing any personal identification information to the receiving party, either through the virtual world or the physical world. A receiving party may, additionally or alternately, choose not to authorize receipt or display of a sending party's self-identifier, thus promoting the maintenance of privacy, anonymity, safety and/or deniability to a receiving party. Moreover, according to some embodiments, one or more of a sending party and a receiving party may choose to permanently erase any content relating to interactions between their own virtual world persona and any other virtual world personas, including any content relating to the existence of their own virtual world persona.

Figure 1:
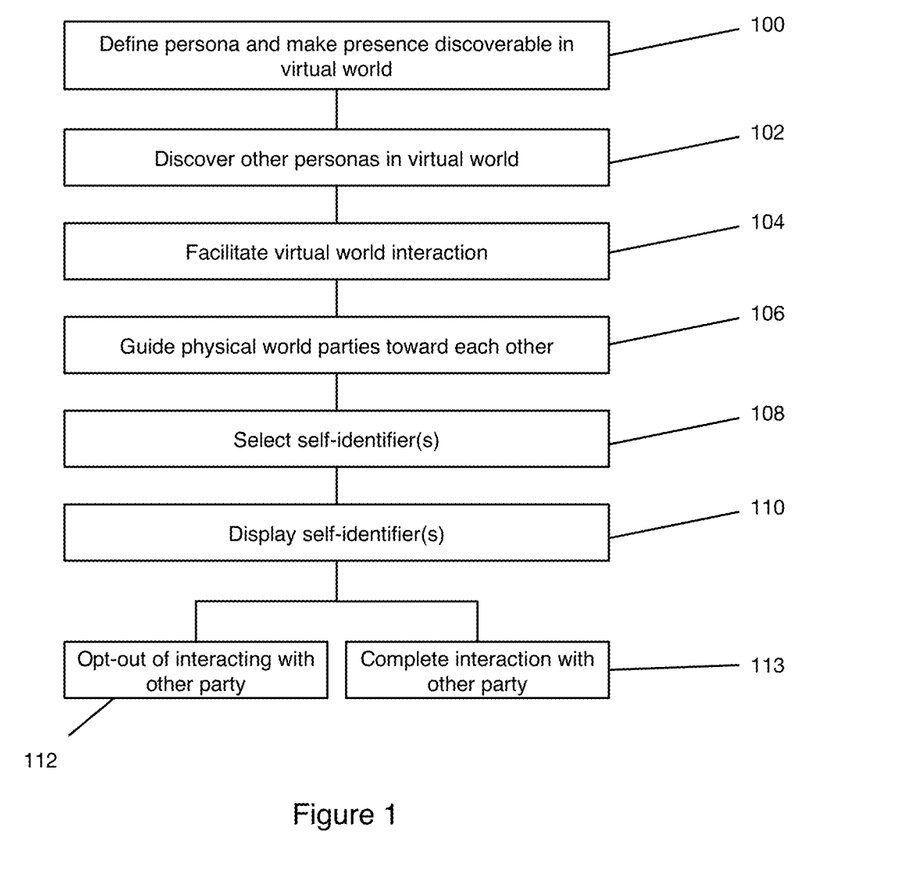
FIG. 1 shows categories of acts associated with various embodiments of the present disclosure.

FIG. 1 is a flow chart that shows, from a high level perspective, categories of acts that may be incorporated into various example embodiments described herein. Interaction between personas in the virtual world may be facilitated through example embodiments described herein. According to some embodiments, a party establishes a persona and makes the presence of the persona discoverable within a virtual world 100. Such interactions may promote or help the parties associated with the virtual world personas to identify a reason for interacting outside of the virtual world (i.e. in the physical world), such as for exchanging goods or services, socializing, and the like. In this respect, a party may discover other personas in the virtual world 102 through the party's own virtual world persona, facilitating virtual world interaction 104.

Physical world parties may be guided toward one another through the use of corresponding virtual world personas 106, according to some example embodiments of the disclosure. This may additionally facilitate physical world interaction 104 while preserving the ability of the parties to walk away from such interaction in a manner that preserves a degree of anonymity, privacy, and/or deniability with respect to the intentions of one or more of the parties or details of any interaction between the parties.

Identifiers (interchangeably referred to herein as "self-identifiers") associated with one or more of the parties may be exchanged through virtual world personas 108. Generally, the content of a self-identifier is unknown other than by the sending party, prior to a receiving party being authorized and/or consenting to view or display content of the self-identifier. Once viewed by the receiving party, the self-identifier may be associated, at least in the mind of the receiving party, with the virtual world persona of the sending party. Acknowledgement of the self-identifier to a receiving party by a sending party may enable the receiving party to correlate the sending party with the virtual world persona through which the self-identifier was received.

Self-identifiers may lack any physical world identification information associated with a sending party or any party. In this respect, identification of a sending party through analysis of a self-identifier may be impeded or prevented. Some examples of physical world identification information that self-identifiers may lack include names of parties, identification numbers of parties, traceable information associated with a party or an electronic computing device used by a party, such as an IP address, a MAC address, or the like. Non-limiting examples of self-identifier contents are: pictures, images, sounds, music, vibration patterns, flashing patterns, machine-readable content, and the like.

According to some embodiments, the physical world party that receives the self-identifier of the sending party may, at their discretion, project or openly display 110 the self-identifier of the sending party in a manner that may be perceived by the sending party. It is to be appreciated that "display", as used herein, refers to exhibiting an identifier in a manner that may be perceived by others. In the case of audible identifiers, "displaying" may include playing the audible identifier. Display of the self-identifier enables the sending party who perceives their own self-identifier displayed by the recipient party to associate the recipient party with the virtual world persona of the recipient party. The exchange and display of self-identifiers may occur solely from one party to another (i.e., unilateral or one way-exchange) or with each party exchanging and displaying a self-identifier (i.e., bilateral, two-way exchange, or multi-party exchange).

According to some embodiments, a party that sends a self-identifier may remain in control as to when another party, already in receipt of the self-identifier, may project, display or even view the self-identifier. In such embodiments, the sending party controls if and when their own self-identifier may be displayed on the electronic device of the receiving party. By giving the sending party control over the time, form, and place where their own identifier may be displayed, the sending party can deny the receiving party any prior knowledge of the sender's self-identifier. This may lower the risk that the receiving party may switch control of their virtual world persona or device to a different physical world party, or may share details of the identifier to other virtual world personas or physical world parties beforehand or before the two parties arrive within physical proximity (e.g. visual or audible recognition distance).

At various points, either party may have the option to cancel, abort or opt out of interacting with the other physical world party 112 in a manner that maintains at least a degree of privacy or anonymity within the physical world. Additionally or alternately, either party may elect to erase their own virtual world persona or portions thereof, including any interactions that may have been made with other virtual world personas. Such an erase function may even extend to records of interaction associated with electronic devices of other persons/parties. In this respect, privacy, anonymity, and/or deniability of physical world parties may be maintained. Alternately, a party may elect to complete an interaction with the other party 113, such as through the various manners described herein.

The term "party", as used herein, refers to an entity that exists or that is generally known or identifiable within the physical world. Non-limiting examples of parties include human beings, groups of human beings that act collectively, mechanical objects (e.g. robots, drones, UAVs, self-driving cars or conveyances), trained animals, business entities, non-profit entities, governmental entities, promotional programs operated by companies or other organizations, and other individuals or organizations having generally known or discoverable identities.

As described herein, parties may use mobile electronic devices, including wearable electronic devices, to implement various example embodiments described herein. It is to be appreciated, however, that the descriptions of example embodiments in this disclosure are non-limiting and that other implementations are also contemplated.

A virtual world persona may be established by a physical world party through various mechanisms. According to some embodiments, a party may establish a profile through an online application that is accessed through an internet browser. Alternately, profile information may be input into a local application resident on a mobile electronic device; in such case, the mobile electronic device may, as an alternative to transmitting information over the internet, use peer-to-peer networks or device-to-device proximity or "mesh" networks, to avoid transmitting information over the internet or as an alternative if internet connectivity is not available.

Figure 2:
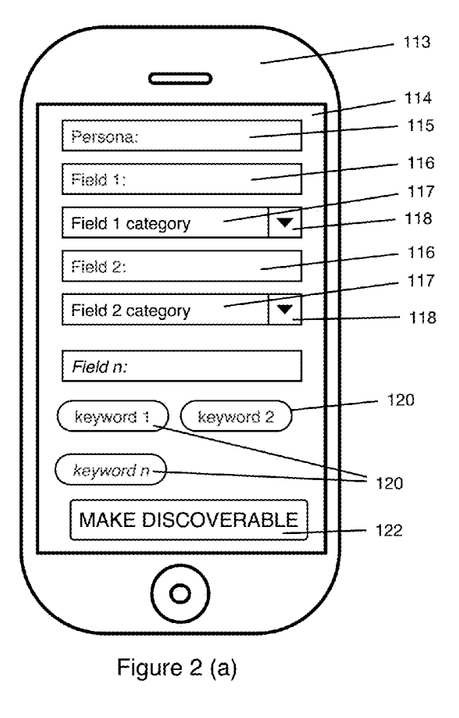
FIGS. 2a and 2b show examples of user interfaces in which a party may create or edit a profile for a virtual world persona, according to an example embodiment.

FIGS. 2a and 2b show examples of user interfaces 114 in which information is provided to establish a persona through a smart phone or tablet type computing device 113, which is one example of a mobile electronic computer device. A party typically establishes at least a virtual name or identifier 115 for a persona, as shown, although names may be omitted according to some embodiments. Other information may be included in a persona profile and may be available for viewing and/or may be searchable by other personas, as indicated by the various data fields 116, data field categories 117, and data field category drop downs 118 shown in FIG. 2a. Separate image fields 119 and keywords fields 120 may also be available for data entry, as shown. The information that is provided to a profile often relates to the purpose for which the party wishes to interact with another party. Some non-limiting examples of additional information are shown in FIGS. 2a and 2b and include keywords, photos or pictures, age, gender, height, weight, technical specifications in the case of a non-human party, indicators of personal interests, items/services for sale or barter or exchange, categories of items for sale, items/services that the party desires to obtain or purchase, categories of items/services that the party desires to obtain or purchase, quotations, audio, and the like. The example embodiments of user interfaces shown in FIGS. 2a and 2b also include a make discoverable button 122, that may be pressed after data has been entered to make a corresponding virtual world personal discoverable by others.

The type and extent of information that a party provides to establish a persona may vary. According to some embodiments, a persona may be established solely with a single entry of information, such as a persona name. According to other embodiments, a party may establish a persona with information that relates to the reason the party desires to interact with another. By way of example, a party that wishes to sell tickets to a RED SOX (Trademark) baseball game may enter "RED SOX TICKETS" as a category or item of interest into a profile to establish a persona. Alternately, additional information, including completion of multiple fields of information on a profile may be required before a persona is established through the system, according to various example embodiments.

Figure 3:
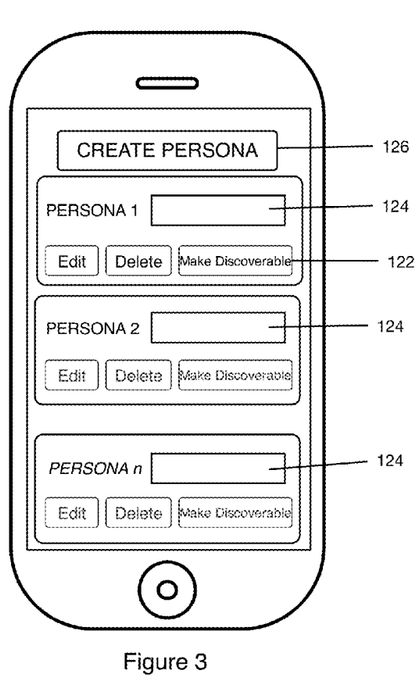
FIG. 3 shows a user interface for establishing a virtual world persona without providing any profile information, according to one embodiment.

According to the example embodiment of FIG. 3, a persona may be established without providing any profile information. In this embodiment, a party requests a persona and, in return, receives one or more persona identifiers 124. The party may then provide the persona identifiers 124 to other personas through various mechanisms, such as through sharing functions in the application, other internet forums, physical bulletin boards or flyers, and the like. The persona identifier 124 may be posted along with the name of an interface, such as a website or application that may be installed on an electronic computer device, through which the persona identifier may be input to contact the persona and corresponding party associated with the persona identifier. The persona identifier, regardless of how acquired by another party, may be used to access the persona associated with the persona identifier through a computer network or an application of a mobile electronic computer device where discussions may take place ahead of potential physical world interaction. In the embodiment of FIG. 3, submitting a single request by pressing the create persona 126 returns multiple persona identifiers 124. According to other embodiments, however, only single person identifier may be returned.

Some third party computer systems on which example embodiments may operate, such as "application stores" that facilitate and/or control installation of software applications, may request user identification information to allow a user to install software associated with various example embodiments herein. It is to be appreciated that, in such scenarios, the application store may retain information indicating that a particular user has downloaded and/or installed software for as described herein. The application store may, however, lack any information associated with operation of the software by the user, according to some embodiments.

Figure 4:
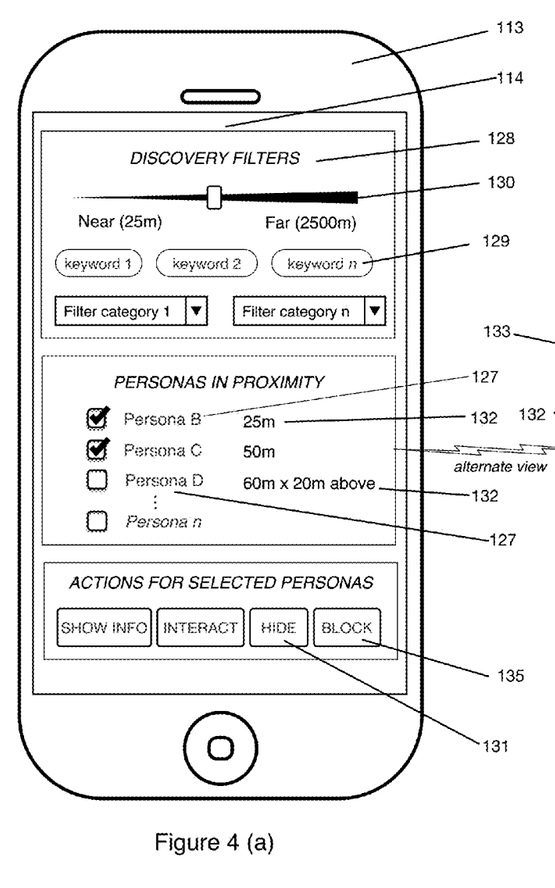
FIGS. 4a and 4b show user interfaces that provide an indicator as to the location of personas/parties, according to various embodiments.

FIG. 4a shows an interface 114 associated with a persona that may be used by a party to interact with other personas, according to one embodiment. As may be seen, the interface 114 may list or show other personas 127 of potential interest for interaction. The listing may include any other personas that are present within a geographical area or areas, such as the area in which the user presently exists. Additionally or alternatively, personas may be filtered with various discovery filters 128 according to other criteria, such as by information that exists within keywords in other persona profiles. For example, according to some embodiments that involve dating, filtering may occur such that only personas associated with a gender of interest within a desired age range and having a desired sexual orientation are shown or listed. According to embodiments that involve buying and selling of goods, persona profiles may be filtered or searched according to the category of goods or keywords. As an example, persona profiles filtered such that only those seeking to buy or sell tickets to a KATY PERRY concert on July 14 may be shown, when this is the item of interest. Other non-limiting examples of filters include filters that operate on fields and/or field categories associated with other personas, keywords 129, geographical proximity 130, and the like.

Features may be included that allow a party to limit the viewing capability of specified personas. It may be beneficial for a user to hide another persona from view on the user interface once the user has determined that the persona is not of interest. A party's own persona may be hidden from view of other specified users, according to some embodiments. This may prove beneficial when a user does not want to be contacted or possibly even to be seen or perceived by another specific persona or group of personas. The embodiment of FIG. 3 shows an example of a hide button 131 that may be depressed to show or hide a particular persona ID.

The user interface may provide a proximity indicator as to the location of personas and corresponding parties. As shown in FIG. 4a, an approximate geographical distance is indicated for each persona that is listed with a proximity indicator 132. As shown, distances may be graduated by twenty five meter increments, with a minimum distance of twenty five meters, although other graduations or types of indicators are also possible, particularly where profiles are viewed over a much larger geographic area or a more confined indoor space. If applicable, vertical distance may also be used and/or displayed (e.g. located on a higher/lower level of a building, or if a persona is aloft or is embodied by a flying drone device). An alternate interface for a proximity indicator 132 is shown in FIG. 4b and includes a grid pattern 133 in which geographic locations of other personas 134 are indicated. The embodiment of FIG. 4b provides indicators of both direction and distance, through positioning of other personas 134 on the grid 133.

The geographical distance indicated 132 on a user interface 114 may be masked (or the accuracy of the indicator mathematically lowered), at least to some degree, to prevent a party from discerning through deductive reasoning which other physical world party is associated with a persona shown on the user interface. This may be accomplished by limiting the proximity indicator and/or the graduations to some minimum value. According to one embodiment that relates to a geographical area with numerous parties/personas present in a highly populated area, the minimum distance that may be indicated is on the order of 50 meters with distances greater than 50 meters being graduated in increments of 25 meters. Other manners of masking or obscuring positions are also possible and are contemplated.

Variable or user definable features may be incorporated into a proximity indicator to prevent users from discerning an association between a persona and a party. Minimum distances and/or gradations may be adjusted by the system depending on the number of personas that are present within a geographical area. As is to be appreciated, the greater the number of parties within an area, the more difficult it may be for a user to discern which of the parties might be associated with a persona within a given distance. The minimum distances and/or gradations may be adjusted automatically according to various factors, including the number of personas that are detectable within an area, the typical population density of an area, and the like. Alternately, a user may specify a minimum distance and/or gradations at which they may appear to other parties based on the user's own comfort level and view of the number of parties in the vicinity.

Figure 5:
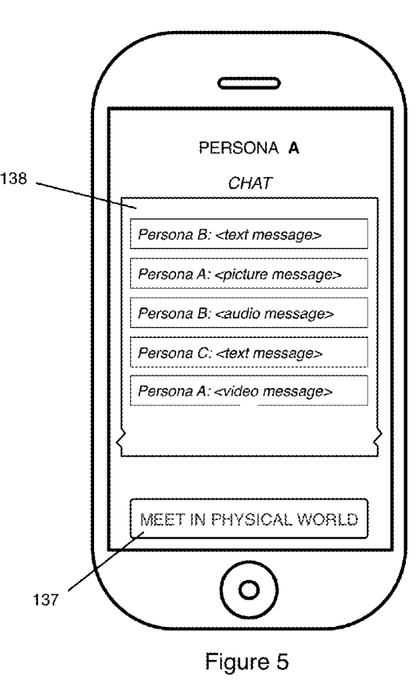
FIG. 5 shows a user interface that includes a chat feature, among others, by which parties may communicate through personas, according to one embodiment.

A user may interact with the persona of another party by chatting with them through a chat interface 138, as shown in FIG. 5. In the illustrated embodiment, the chat screen appears along with profile information when a user selects another persona from another interface, such as that of FIG. 4a, although other configurations are also contemplated. Chat can include exchange of free-form or pre-written text and image messages, recorded or real-time video or audio, and other means. A user, or party A in the illustrated embodiment, may take various actions through features shown in the interface of FIGS. 4a and 5. Party A may activate a blocking button 135 to prevent the persona associated with a selected profile (Party C, as illustrated) from further interaction with the Party A's persona. Additionally or alternatively, a user may activate a feature that makes the user's persona invisible to the selected persona.

A user may indicate a desire to meet within another party/persona in the physical world through a user interface of the system. FIG. 5 shows a button 137 that may be activated by party A to initiate a process that guides the user to a selected persona/party combination. Once activated, the interface of the selected persona/party (Party A, according to one example) is alerted that another party has indicated a desire to interact in the physical world. Party B, associated with persona B, may elect to activate a similar button on a profile that is associated with party A's profile to accept the request from party A. At this point, the system may facilitate a physical world meeting through various mechanisms. According to other embodiments, physical world interaction may be facilitated when one of two or more parties indicates a desire for a physical world meeting, rather than when agreement is reached between a pair of parties, as described above.

Figure 6:
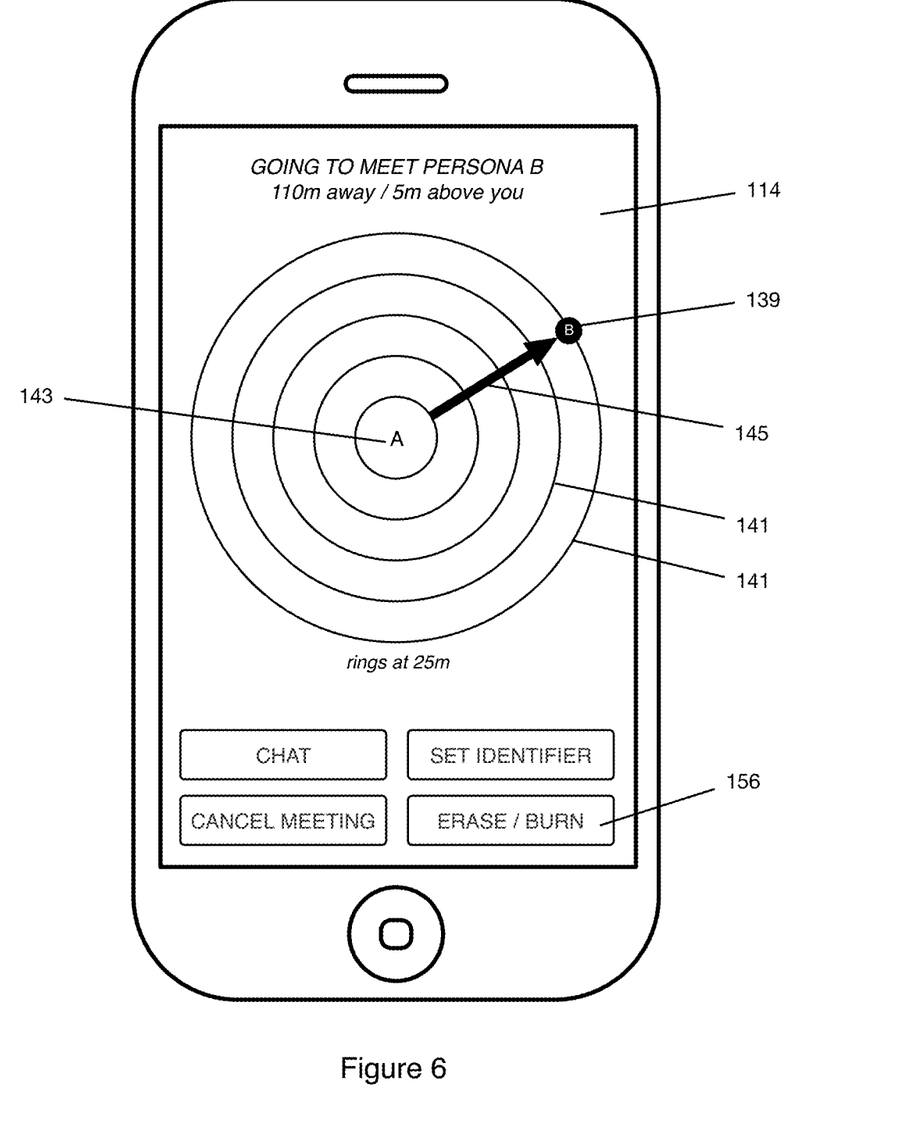
FIG. 6 shows a user interface for guiding parties toward one another to facilitate physical world interaction, according to one embodiment.

Parties that, through communicating via personas, identify a desire to interact in the physical world may use aspects of the system to be physically guided toward one another's vicinity. FIG. 6 shows a user interface 114, according to one embodiment, that identifies the direction and distance between a selected persona/party (party B) in relation to the user (party A). As illustrated, the party/persona is shown as a blip 139 on a set of concentric circles 141, such as may be found on a radar screen. The center 143 of the concentric circles is representative of party A's position while the blip 139 is representative of the geographical location of party B's position, thereby indicating a general direction toward the selected persona/party. Each of the concentric circles may represent a distance to the selected persona/party. Other features may be used to indicate direction and distance, such as an arrow 145 representing a vector toward a selected party persona according to one alternative embodiment.

Figure 7:
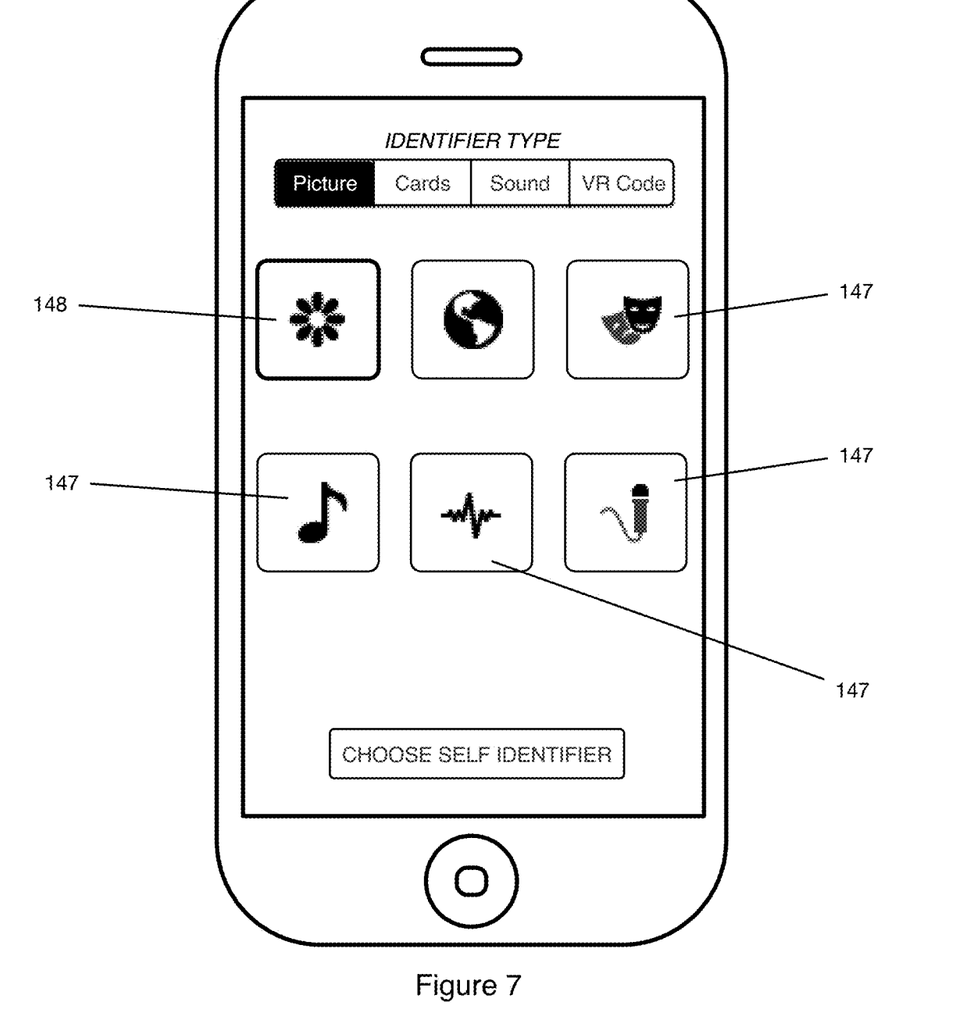
FIG. 7 shows a examples of self-identifiers that a party may select, according to an example embodiment.
Figure 8:
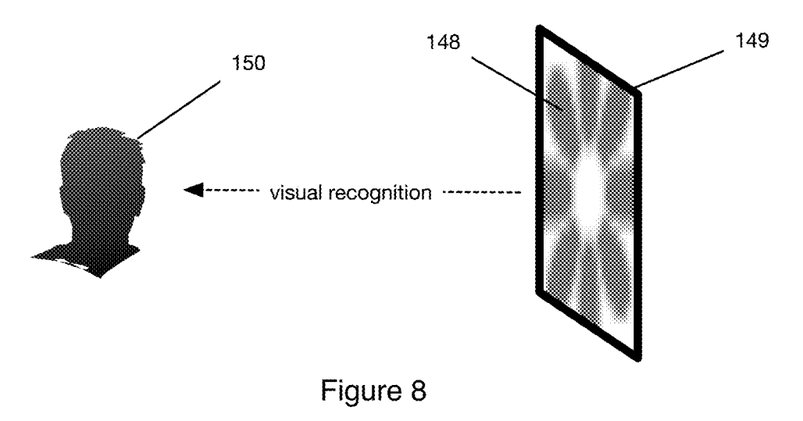
FIG. 8 shows a process by which parties may exchange self-identifiers, according to various embodiments.

Parties that have decided to interact with one another in the physical world, through interaction via their respective personas, may act through the system to confirm associations between physical world parties and virtual world personas. FIG. 7 shows how this may occur, according to one embodiment. Party A, accessing an associated persona through a mobile electronic device, transmits a self-identifier to party B. In the illustrated embodiment, party A has selected an image of a sunflower 148 as a self-identifier. The self-identifier is received by a persona B through an electronic device 149 of the party B, as represented in FIG. 8. Absent other controls, Party B now has knowledge of the self-identifier associated with persona A but, absent other events, has no other information from which the identity of the party A may be deduced. Similarly, party A has no knowledge from which to directly deduce the identity of the party B, absent other events, even though party A has transmitted the self-identifier to party B through the associated persona.

According to some embodiments, the self-identifier may not be viewed, projected, or displayed until authorized by the sender. By way of example, at the time of the physical world meeting, Party A may request Party B to display or exhibit Party A's identifier, through the application, and Party B may then consent to exhibit the self-identifier of party A to enable party A to associate the physical world party B with the virtual world persona B. This is represented in FIG. 8 by the electronic computer device of party B 149 being positioned in a manner that allows the self-identifier to be viewed, heard or otherwise sensed by other parties, potentially including party A 150. The party A, having witnessed the self-identifier exhibited by party B, may then safely deduce that party B is associated with persona B. Party B now has knowledge of the self-identifier that is associated with persona A but, absent other events, has no knowledge from which the physical-world association of party A may be deduced.

Party B may additionally have interest in associating a physical world party (i.e., the physical world party A) with the virtual world persona of party A (i.e., persona A). In such instances, a similar process may be followed as described with respect to FIG. 8, but with the roles of each party reversed. The self-identifier is received by the persona B through the mobile electronic device of party B.

Party A may also elect to exhibit the party B self-identifier to enable the party B to associate the physical world party A with the virtual world persona A. Party B, having perceived the party B self-identifier exhibited by party A, may now safely deduce that party A is associated with persona A.

According to some embodiments, self-identifiers include visual images that may be displayed from an electronic device. By way of non-limiting example, the self-identifiers shown and discussed with references to FIGS. 7 and 8 include an image of a sunflower displayed on the screen of a mobile electronic device. Other common images used as self-identifiers include images from playing cards. Self-identifiers 147 may also include sounds, or videos or progressions of images, such as a time-lapse video of a blooming flower that is displayed from the screen of the mobile electronic device. Images or videos may be accompanied by audio, such as for example a duck displayed in combination with an audible 'quacking' sound. It is to be appreciated that myriad other images, videos, and/or audio may be used as self-identifiers 147, either alone or in combination, and that the examples provided herein are non-limiting.

Figure 9:
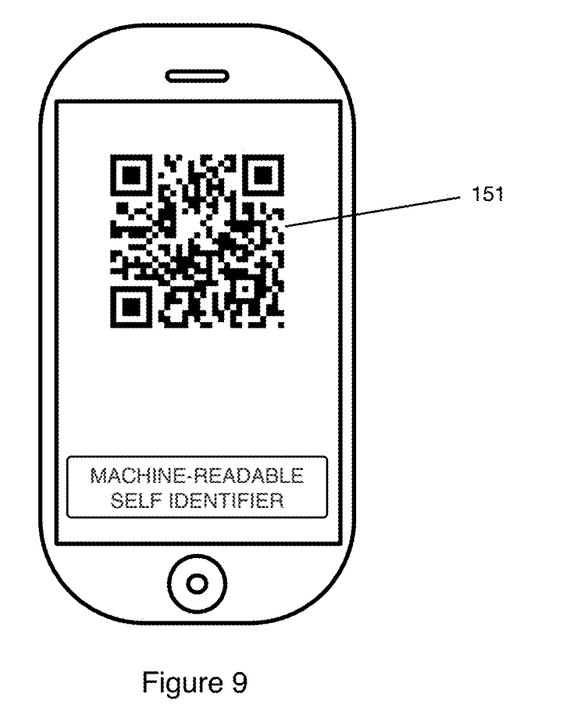
FIG. 9 shows an example of one self-identifier, as may be used in conjunction with various embodiments.

The self-identifiers represented and discussed with references to the embodiment of FIGS. 7 and 8 are distinguishable by the average naked human eye and/or ears. According to some embodiments, however, all of or portions of a self-identifier may be generally indistinguishable by a human without machine assistance. By way of example, FIG. 9 shows a multi-dimensional bar code 151, such as a QR CODE, displayed on the screen of mobile electronic device. A party may perceive the existence of such a self-identifier when displayed, while additional information remains obscured from the naked human eye or hearing. An electronic device, such as the party's own mobile electronic device, may be used to detect and interpret such a self-identifier. Other types of human indistinguishable self-identifiers include series of tones, such as included within CODEC-type telephony communications, rapidly transmitted Morse code signals, ultrasonic sounds, infrared or ultraviolet light, vibrations, one-dimensional bar codes, and the like.

According to other embodiments, the presence of a self-identifier or a portion of a self-identifier may be undetectable by a human, at least without machine assistance. Such self-identifiers may include VISUAL RESPONSE CODES or VR CODES (Trademark) or similar type codes that embed information in patterns of light that are transmitted to a reader, such as the camera and associated reader application of a mobile electronic device.

Self-identifiers may be presented through mechanisms other than a mobile electronic device. According to some embodiments, instructions may be provided from one party to another through associated personas. Instructions may indicate particular actions that are to be performed to allow the sending party to associate the receiving party with their corresponding persona. Instructions may, for example, request that the receiving party twirl a pen in their right hand, put their hat on backwards, cough loudly three times, and the like. According to other embodiments, instructions may accompany visual or audio type self-identifiers.

Either party may elect to abort or opt out of interacting at points throughout the process described herein. Moreover, according to example embodiments, a party may do so while maintaining anonymity and/or deniability as to their involvement in such interactions. This may help promote safety for the party. Should a party no longer wish to interact within the physical world, they may simply refuse to share their self-identifier, refuse to acknowledge their self-identifier, turn off their profile, turn off the application hosting the party/persona profile, or the like.

Parties may, additionally or alternatively, choose to erase any evidence or history of interaction between their corresponding persona and that of another. Embodiments may include a "burn" button 156, such as shown in FIG. 6, that may be activated to delete any evidence of interaction with another persona. This may not only delete evidence from the device of the party activating the burn button, but also on the device(s) of the persona that is selected. Deletion may occur only upon activating the burn button, according to some embodiments. According to other embodiments, deletion of evidence of interaction may occur regularly, such as within a prescribed time after receipt by another persona (for example, any chat messages sent/received may be ephemeral—disappearing after a prescribed time).

The following examples pertain to further embodiments, from which numerous permutations and configurations will be apparent.

Example 1 is a computer program product comprising one or more non-transient computer-readable mediums having encoded thereon executable instructions that, when executed by at least one processor, cause the at least one processor to carry out a process of identifying, through a computer network including a plurality of electronic computer devices, a physical world party that is associated with virtual world persona with whom virtual work interaction has occurred, the process comprising: selecting content for a physical world party A self-identifier on an electronic computer device of physical world party A to be transmitted to an electronic computer device of physical world party B through the computer network and to virtual world persona B, content of the physical world party A self-identifier lacking traceable physical world identification information associated with physical world party A; transmitting the physical world party A self-identifier to the electronic computer device of physical world party B through the computer network and to virtual world persona B; authorizing display of the physical world party A self-identifier by the electronic computer device of physical world party B, content of the physical world party A self-identifier being unbeknownst to physical world Party B prior to receipt of the physical world party A self-identifier by the electronic computer device of physical world Party B and display of the physical world party A self-identifier by the electronic computer device of physical world party B after display by the electronic computer device of physical world party B is authorized; perceiving the physical world party A self-identifier, as projected by real world party B in proximity of physical world party A, to enable physical world party A to identify physical world party B as associated with virtual world persona B to whom the physical world party A self-identifier was transmitted.

Example 2 includes the subject matter of example 1, wherein authorizing display of the physical world party A self-identifier includes transmitting an authorization from the electronic computer device of party A to the electronic computer device of party B subsequent to transmitting the physical world party A self-identifier from the electronic computer device of physical world party A to the electronic computer device of physical world party B.

Example 3 includes the subject matter of example 1, wherein authorizing display of the physical world party A self-identifier occurs automatically after a length of time elapses subsequent to transmitting the physical world part A self-identifier to the electronic computer device of physical party B through the computer network.

Example 4 includes the subject matter of example 1, wherein authorizing display of the physical world party A self-identifier occurs upon the electronic computer device of physical world party B entering a geographic proximity of the electronic computer device of physical world party A.

Example 5 includes the subject matter of example 4, wherein a distance value for the geographic proximity is defined by physical world party A.

Example 6 includes the subject matter of example 4, wherein a distance value for the geographic proximity is defined by physical world party B.

Example 7 includes the subject matter of example 4, wherein a value for the geographic proximity is determined, at least in part, by a population density in a region of the electronic computer device of physical world party A.

Example 8 includes the subject matter of example 1, wherein authorizing display of the physical world party A self-identifier includes authorizing display of the physical world party A self-identifier for a limited duration of time.

Example 9 includes the subject matter of example 8, wherein the limited duration of time terminates upon physical world party A terminating authorization to display the physical world party A self-identifier.

Example 10 includes the subject matter of example 8, wherein the limited duration of time is a fixed time period that begins when physical world party B begins to display the physical world party A self-identifier on the electronic computer device of physical world party B.

Example 11 includes the subject matter of example 10, wherein the fixed time period is definable by physical world party A prior to transmitting the physical world party A self-identifier to the electronic computer device of physical world party B from the electronic computer device of physical world party A.

Example 12 includes the subject matter of example 8, wherein authorizing display of the physical world party A self-identifier for the limited duration includes authorizing display by contacting a display indicator on the electronic computer device of physical world party B and deauthorizing display of the physical world party A self-identifier when physical world party B terminates contact with a display indicator on the electronic computer device of physical world party B.

Example 13 includes the subject matter of example 1, wherein authorizing display of the physical world party A self-identifier by the electronic computer device of physical world party B includes physical world party B providing consent to display of the physical world party A self-identifier by the electronic computer device of physical world party B.

Example 14 includes the subject matter of example 1, and further includes indicating a position of the mobile electronic computer device of physical world party B relative to the electronic computer device of physical world party A with an indicator on the electronic computer device of physical world party A.

Example 15 includes the subject matter of example 14, wherein indicating the position includes providing an indicator of distance and direction of the mobile electronic computer device of physical world party B relative to the electronic computer device of physical world party A.

Example 16 includes the subject matter of example 1, and further includes indicating a position of the electronic computer device of physical world party A relative to the mobile electronic computer device of physical world party B with an indicator on the mobile electronic computer device of physical world party B.

Example 17 includes the subject matter of example 14, wherein indicating the position includes providing an indicator of distance and direction of the electronic computer device of physical world party A relative to the mobile electronic computer device of physical world party B.

Example 18 includes the subject matter of example 1, wherein the content of physical world party A self-identifier includes an audible signal to be projected from the mobile electronic computer device of physical world party B.

Example 19 includes the subject matter of example 1, wherein the content of the physical world party A self-identifier includes a visual image to be displayed from the mobile electronic computer device of physical world party B.

Example 20 includes the subject matter of example 1, wherein the content of the physical world party A self-identifier is distinguishable by a human.

Example 21 includes the subject matter of example 1, wherein the content of the physical world party A self-identifier is indistinguishable by a human and further wherein perceiving the physical world party A self-identifier includes perceiving the physical world party A self-identifier with an electronic computer device.

Example 22 includes the subject matter of example 1, wherein the content of the physical world party A self-identifier includes instructions to be carried out by physical world party B in a manner that is perceivable by physical world party A.

Example 23 includes the subject matter of example 1, and further includes erasing records of interactions between virtual world persona A and virtual world persona B on each of the electronic computer device of physical world party A and the mobile electronic computer device of physical world party B.

Example 24 includes the subject matter of example 23, wherein erasing records occurs upon physical world party B activating an erase function on the electronic computer device of physical world party B.

Example 25 includes the subject matter of example 23, wherein erasing records occurs upon physical world party A activating an erase function on the electronic computer device of physical world party A.

Example 26 includes the subject matter of example 23, wherein erasing records occurs automatically after a fixed time elapses subsequent to display of the physical world party A self-identifier on the electronic computer device of physical world party A.

Example 27 includes the subject matter of example 1, wherein the computer network is a peer-to-peer computer network and wherein transmitting the physical world party A self-identifier to the mobile electronic computer device of persona B includes transmitting the physical world party A self-identifier from the electronic computer device of physical world party A directly to the mobile electronic computer device of physical world party B.

Example 28 includes the subject matter of example 1, and further includes receiving a physical world party B self-identifier on the electronic computer device of persona A, content of the physical world party B self-identifier previously unbeknownst to physical world party A; and projecting the physical world party B self-identifier in a manner that is perceivable by physical world party B to enable physical world party B to identify physical world party A as associated with virtual world persona A.

Example 29 includes the subject matter of example 28, and further includes authorizing display of the physical world party B self-identifier by the electronic computer device of physical world party A, content of the physical world party B self-identifier being unbeknownst to physical world Party A prior to receipt of the physical world party B self-identifier by the electronic computer device of physical world Party A and display of the physical world party B self-identifier by the electronic computer device of physical world party A.

Example 30 is a system, comprising: one or more electronic computer devices; and a memory having encoded thereon executable instructions that, when executed by the one or more electronic computer devices, cause the one or more electronic computer devices to carry out a process of identifying, through a computer network including the one or more electronic computer devices, a physical world party that is associated with virtual world persona with whom virtual work interaction has occurred, the process including: selecting content for a physical world party A self-identifier on an electronic computer device of physical world party A to be transmitted to an electronic computer device of physical world party B through the computer network and to virtual world persona B, content of the physical world party A self-identifier lacking traceable physical world identification information associated with physical world party A; transmitting the physical world party A self-identifier to the electronic computer device of physical world party B through the computer network and to virtual world persona B; authorizing display of the physical world party A self-identifier by the electronic computer device of physical world party B, content of the physical world party A self-identifier being unbeknownst to physical world Party B prior to receipt of the physical world party A self-identifier by the electronic computer device of physical world Party B and display of the physical world party A self-identifier by the electronic computer device of physical world party B after display by the electronic computer device of physical world party B is authorized; perceiving the physical world party A self-identifier, as projected by real world party B in proximity of physical world party A, to enable physical world party A to identify physical world party B as associated with virtual world persona B to whom the physical world party A self-identifier was transmitted.

Example 31 includes the subject matter of example 30, wherein authorizing display of the physical world party A self-identifier includes transmitting an authorization from the electronic computer device of party A to the electronic computer device of party B subsequent to transmitting the physical world party A self-identifier from the electronic computer device of physical world party A to the electronic computer device of physical world party B.

Example 32 includes the subject matter of example 30, wherein authorizing display of the physical world party A self-identifier occurs automatically after a length of time elapses subsequent to transmitting the physical world part A self-identifier to the electronic computer device of physical party B through the computer network.

Example 33 includes the subject matter of example 30, wherein authorizing display of the physical world party A self-identifier occurs upon the electronic computer device of physical world party B entering a geographic proximity of the electronic computer device of physical world party A.

Example 34 includes the subject matter of example 33, wherein a distance value for the geographic proximity is defined by physical world party A.

Example 35 includes the subject matter of example 33, wherein a distance value for the geographic proximity is defined by physical world party B.

Example 36 includes the subject matter of example 33, wherein a value for the geographic proximity is determined, at least in part, by a population density in a region of the electronic computer device of physical world party A.

Example 37 includes the subject matter of example 30, wherein authorizing display of the physical world party A self-identifier includes authorizing display of the physical world party A self-identifier for a limited duration of time.

Example 38 includes the subject matter of example 37, wherein the limited duration of time terminates upon physical world party A terminating authorization to display the physical world party A self-identifier.

Example 39 includes the subject matter of example 37, wherein the limited duration of time is a fixed time period that begins when physical world party B begins to display the physical world party A self-identifier on the electronic computer device of physical world party B.

Example 40 includes the subject matter of example 39, wherein the fixed time period is definable by physical world party A prior to transmitting the physical world party A self-identifier to the electronic computer device of physical world party B from the electronic computer device of physical world party A.

Example 41 includes the subject matter of example 37, wherein authorizing display of the physical world party A self-identifier for the limited duration includes authorizing display by contacting a display indicator on the electronic computer device of physical world party B and deauthorizing display of the physical world party A self-identifier when physical world party B terminates contact with a display indicator on the electronic computer device of physical world party B.

Example 42 includes the subject matter of example 30, wherein authorizing display of the physical world party A self-identifier by the electronic computer device of physical world party B includes physical world party B providing consent to display of the physical world party A self-identifier by the electronic computer device of physical world party B.

Example 43 includes the subject matter of example 30, and further includes indicating a position of the mobile electronic computer device of physical world party B relative to the electronic computer device of physical world party A with an indicator on the electronic computer device of physical world party A.

Example 44 includes the subject matter of example 43, wherein indicating the position includes providing an indicator of distance and direction of the mobile electronic computer device of physical world party B relative to the electronic computer device of physical world party A.

Example 45 includes the subject matter of example 30, and further includes indicating a position of the electronic computer device of physical world party A relative to the mobile electronic computer device of physical world party B with an indicator on the mobile electronic computer device of physical world party B.

Example 46 includes the subject matter of example 43, wherein indicating the position includes providing an indicator of distance and direction of the electronic computer device of physical world party A relative to the mobile electronic computer device of physical world party B.

Example 47 includes the subject matter of example 30, wherein the content of physical world party A self-identifier includes an audible signal to be projected from the mobile electronic computer device of physical world party B.

Example 48 includes the subject matter of example 30, wherein the content of the physical world party A self-identifier includes a visual image to be displayed from the mobile electronic computer device of physical world party B.

Example 49 includes the subject matter of example 30, wherein the content of the physical world party A self-identifier is distinguishable by a human.

Example 50 includes the subject matter of example 30, wherein the content of the physical world party A self-identifier is indistinguishable by a human and further wherein perceiving the physical world party A self-identifier includes perceiving the physical world party A self-identifier with an electronic computer device.

Example 51 includes the subject matter of example 30, wherein the content of the physical world party A self-identifier includes instructions to be carried out by physical world party B in a manner that is perceivable by physical world party A.

Example 52 includes the subject matter of example 30, and further includes erasing records of interactions between virtual world persona A and virtual world persona B on each of the electronic computer device of physical world party A and the mobile electronic computer device of physical world party B.

Example 53 includes the subject matter of example 52, wherein erasing records occurs upon physical world party B activating an erase function on the electronic computer device of physical world party B.

Example 54 includes the subject matter of example 52, wherein erasing records occurs upon physical world party A activating an erase function on the electronic computer device of physical world party A.

Example 55 includes the subject matter of example 52, wherein erasing records occurs automatically after a fixed time elapses subsequent to display of the physical world party A self-identifier on the electronic computer device of physical world party A.

Example 56 includes the subject matter of example 30, wherein the computer network is a peer-to-peer computer network and wherein transmitting the physical world party A self-identifier to the mobile electronic computer device of persona B includes transmitting the physical world party A self-identifier from the electronic computer device of physical world party A directly to the mobile electronic computer device of physical world party B.

Example 57 includes the subject matter of example 30, and further includes receiving a physical world party B self-identifier on the electronic computer device of persona A, content of the physical world party B self-identifier previously unbeknownst to physical world party A; projecting the physical world party B self-identifier in a manner that is perceivable by physical world party B to enable physical world party B to identify physical world party A as associated with virtual world persona A.

Example 58 includes the subject matter of example 57, and further includes authorizing display of the physical world party B self-identifier by the electronic computer device of physical world party A, content of the physical world party B self-identifier being unbeknownst to physical world Party A prior to receipt of the physical world party B self-identifier by the electronic computer device of physical world Party A and display of the physical world party B self-identifier by the electronic computer device of physical world party A.

Example 59 is a method of identifying, through a computer network including the one or more electronic computer devices, a physical world party that is associated with virtual world persona with whom virtual work interaction has occurred, the method comprising: selecting content for a physical world party A self-identifier on an electronic computer device of physical world party A to be transmitted to an electronic computer device of physical world party B through the computer network and to virtual world persona B, content of the physical world party A self-identifier lacking traceable physical world identification information associated with physical world party A; transmitting the physical world party A self-identifier to the electronic computer device of physical world party B through the computer network and to virtual world persona B; authorizing display of the physical world party A self-identifier by the electronic computer device of physical world party B, content of the physical world party A self-identifier being unbeknownst to physical world Party B prior to receipt of the physical world party A self-identifier by the electronic computer device of physical world Party B and display of the physical world party A self-identifier by the electronic computer device of physical world party B after display by the electronic computer device of physical world party B is authorized; perceiving the physical world party A self-identifier, as projected by real world party B in proximity of physical world party A, to enable physical world party A to identify physical world party B as associated with virtual world persona B to whom the physical world party A self-identifier was transmitted.

Example 60 includes the subject matter of example 59, wherein authorizing display of the physical world party A self-identifier includes transmitting an authorization from the electronic computer device of party A to the electronic computer device of party B subsequent to transmitting the physical world party A self-identifier from the electronic computer device of physical world party A to the electronic computer device of physical world party B.

Example 61 includes the subject matter of example 59, wherein authorizing display of the physical world party A self-identifier occurs automatically after a length of time elapses subsequent to transmitting the physical world part A self-identifier to the electronic computer device of physical party B through the computer network.

Example 62 includes the subject matter of example 59, wherein authorizing display of the physical world party A self-identifier occurs upon the electronic computer device of physical world party B entering a geographic proximity of the electronic computer device of physical world party A.

Example 63 includes the subject matter of example 62, wherein a distance value for the geographic proximity is defined by physical world party A.

Example 64 includes the subject matter of example 62, wherein a distance value for the geographic proximity is defined by physical world party B.

Example 65 includes the subject matter of example 62, wherein a value for the geographic proximity is determined, at least in part, by a population density in a region of the electronic computer device of physical world party A.

Example 66 includes the subject matter of example 59, wherein authorizing display of the physical world party A self-identifier includes authorizing display of the physical world party A self-identifier for a limited duration of time.

Example 67 includes the subject matter of example 66, wherein the limited duration of time terminates upon physical world party A terminating authorization to display the physical world party A self-identifier.

Example 68 includes the subject matter of example 66, wherein the limited duration of time is a fixed time period that begins when physical world party B begins to display the physical world party A self-identifier on the electronic computer device of physical world party B.

Example 69 includes the subject matter of example 68, wherein the fixed time period is definable by physical world party A prior to transmitting the physical world party A self-identifier to the electronic computer device of physical world party B from the electronic computer device of physical world party A.

Example 70 includes the subject matter of example 66, wherein authorizing display of the physical world party A self-identifier for the limited duration includes authorizing display by contacting a display indicator on the electronic computer device of physical world party B and deauthorizing display of the physical world party A self-identifier when physical world party B terminates contact with a display indicator on the electronic computer device of physical world party B.

Example 71 includes the subject matter of example 59, wherein authorizing display of the physical world party A self-identifier by the electronic computer device of physical world party B includes physical world party B providing consent to display of the physical world party A self-identifier by the electronic computer device of physical world party B.

Example 72 includes the subject matter of example 59, and further includes: indicating a position of the mobile electronic computer device of physical world party B relative to the electronic computer device of physical world party A with an indicator on the electronic computer device of physical world party A.

Example 73 includes the subject matter of example 72, wherein indicating the position includes providing an indicator of distance and direction of the mobile electronic computer device of physical world party B relative to the electronic computer device of physical world party A.

Example 74 includes the subject matter of example 59, and further includes: indicating a position of the electronic computer device of physical world party A relative to the mobile electronic computer device of physical world party B with an indicator on the mobile electronic computer device of physical world party B.

Example 75 includes the subject matter of example 72, wherein indicating the position includes providing an indicator of distance and direction of the electronic computer device of physical world party A relative to the mobile electronic computer device of physical world party B.

Example 76 includes the subject matter of example 59, wherein the content of physical world party A self-identifier includes an audible signal to be projected from the mobile electronic computer device of physical world party B.

Example 77 includes the subject matter of example 59, wherein the content of the physical world party A self-identifier includes a visual image to be displayed from the mobile electronic computer device of physical world party B.

Example 78 includes the subject matter of example 59, wherein the content of the physical world party A self-identifier is distinguishable by a human.

Example 79 includes the subject matter of example 59, wherein the content of the physical world party A self-identifier is indistinguishable by a human and further wherein perceiving the physical world party A self-identifier includes perceiving the physical world party A self-identifier with an electronic computer device.

Example 80 includes the subject matter of example 59, wherein the content of the physical world party A self-identifier includes instructions to be carried out by physical world party B in a manner that is perceivable by physical world party A.

Example 81 includes the subject matter of example 59, further comprising:

erasing records of interactions between virtual world persona A and virtual world persona B on each of the electronic computer device of physical world party A and the mobile electronic computer device of physical world party B.

Example 82 includes the subject matter of example 81, wherein erasing records occurs upon physical world party B activating an erase function on the electronic computer device of physical world party B.

Example 83 includes the subject matter of example 81, wherein erasing records occurs upon physical world party A activating an erase function on the electronic computer device of physical world party A.

Example 84 includes the subject matter of example 81, wherein erasing records occurs automatically after a fixed time elapses subsequent to display of the physical world party A self-identifier on the electronic computer device of physical world party A.

Example 85 includes the subject matter of example 59, wherein the computer network is a peer-to-peer computer network and wherein transmitting the physical world party A self-identifier to the mobile electronic computer device of persona B includes transmitting the physical world party A self-identifier from the electronic computer device of physical world party A directly to the mobile electronic computer device of physical world party B.

Example 86 includes the subject matter of example 59, and further includes: receiving a physical world party B self-identifier on the electronic computer device of persona A, content of the physical world party B self-identifier previously unbeknownst to physical world party A; projecting the physical world party B self-identifier in a manner that is perceivable by physical world party B to enable physical world party B to identify physical world party A as associated with virtual world persona A.

Example 87 includes the subject matter of example 86, and further includes: authorizing display of the physical world party B self-identifier by the electronic computer device of physical world party A, content of the physical world party B self-identifier being unbeknownst to physical world Party A prior to receipt of the physical world party B self-identifier by the electronic computer device of physical world Party A and display of the physical world party B self-identifier by the electronic computer device of physical world party A.

Embodiments of the invention may include a burn button associated with a party's own profile. Activation of such a burn button may permanently delete a party's own persona/profile, including deleting evidence of interaction that has occurred with the profile, including evidence on electronic devices of other parties. A burn button may also delete the software application of the system that is resident on a party's mobile electronic device, including any evidence of the party's profile and interactions with others.

The above-described embodiments of the present invention can be implemented in any of numerous ways. For example, the embodiments may be implemented using hardware, software or a combination thereof. When implemented in software, the software code may be executed on any suitable processor or collection of processors, whether provided in a single computer or distributed among multiple computers.

Components of data-entry systems described herein may be implemented using a single computer or its functionality may be distributed across multiple computers or servers. In such a setting, communication among system components/modules/interfaces may be realized in any suitable manner (e.g., wired, wireless, network-based connections) as the present invention is not limited in this respect.

It should be appreciated that a computer may be embodied in any of numerous forms, such as a rack-mounted computer, a desktop computer, a laptop computer, or a tablet computer. Additionally, a computer may be embodied in any device with suitable processing capabilities, including a mobile electronic device, a smart phone, wearable electronic device or any other suitable portable or fixed electronic device.

Also, a computer may have one or more input and output devices. These devices may be used, among other things, to present a user interface. Examples of output devices that may be used to provide a user interface include printers or display screens for visual presentation of output, and speakers or other sound generating devices for audible presentation of output. Examples of input devices that may be used for a user interface include keyboards, microphones, and pointing devices, such as mice, touch pads, and digitizing tablets.

Such computers may be interconnected by one or more networks in any suitable form, including a local area network (LAN) or a wide area network (WAN), such as an enterprise network, or the Internet. Such networks may be based on any suitable technology and may operate according to any suitable protocol and may include wireless networks, wired networks, and/or fiber optic networks.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one nontransitory computer readable storage medium (e.g., a computer memory, one or more compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments. The nontransitory computer-readable medium or media may be transportable, such that the program or programs stored thereon may be loaded onto any computer resource to implement various aspects of the embodiments as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various embodiments.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law. Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

The invention claimed is:

1. A method of identifying, through a computer network including the one or more electronic computer devices, a physical world party that is associated with virtual world persona with whom virtual work interaction has occurred, the method comprising:

selecting content for a physical world party A self-identifier on an electronic computer device of physical world party A to be transmitted to an electronic computer device of physical world party B through the computer network and to virtual world persona B, content of the physical world party A self-identifier excluding traceable physical world identification information associated with physical world party A;

transmitting the physical world party A self-identifier to the electronic computer device of physical world party B through the computer network and to virtual world persona B;

authorizing display of the physical world party A self-identifier by the electronic computer device of physical world party B, content of the physical world party A self-identifier being unknown to physical world Party B prior to receipt of the physical world party A self-identifier by the electronic computer device of physical world Party B and display of the physical world party A self-identifier by the electronic computer device of physical world party B after display by the electronic computer device of physical world party B is authorized; and perceiving the physical world party A self-identifier, as projected by real world party B in proximity of physical world party A, to enable physical world party A to identify physical world party B as associated with virtual world persona B to whom the physical world party A self-identifier was transmitted;

wherein authorizing display of the physical world party A self-identifier includes transmitting an authorization from the electronic computer device of party A to the electronic computer device of party B subsequent to transmitting the physical world party A self-identifier from the electronic computer device of physical world party A to the electronic computer device of physical world party B.

2. The method of claim 1, wherein authorizing display of the physical world party A self-identifier occurs automatically after a length of time elapses subsequent to transmitting the physical world part A self-identifier to the electronic computer device of physical party B through the computer network.

3. The method of claim 1, wherein authorizing display of the physical world party A self-identifier occurs upon the electronic computer device of physical world party B entering a geographic proximity of the electronic computer device of physical world party A.

4. The method of claim 3, wherein a distance value for the geographic proximity is defined by physical world party B.

5. The method of claim 3, wherein a value for the geographic proximity is determined, at least in part, by a population density in a region of the electronic computer device of physical world party A.

6. The method of claim 1, wherein authorizing display of the physical world party A self-identifier includes authorizing display of the physical world party A self-identifier for a limited duration of time.

7. The method of claim 6, wherein the limited duration of time is a fixed time period that begins when physical world party B begins to display the physical world party A self-identifier on the electronic computer device of physical world party B.

8. The method of claim 7, wherein the fixed time period is definable by physical world party A prior to transmitting the physical world party A self-identifier to the electronic computer device of physical world party B from the electronic computer device of physical world party A.

9. The method of claim 6, wherein authorizing display of the physical world party A self-identifier for the limited duration includes authorizing display by contacting a display indicator on the electronic computer device of physical world party B and deauthorizing display of the physical world party A self-identifier when physical world party B terminates contact with a display indicator on the electronic computer device of physical world party B.

10. The method of claim 1, wherein authorizing display of the physical world party A self-identifier by the electronic computer device of physical world party B includes physical world party B providing consent to display of the physical world party A self-identifier by the electronic computer device of physical world party B.

11. The method of claim 1, further comprising:
indicating a position of the mobile electronic computer device of physical world party B relative to the electronic computer device of physical world party A with an indicator on the electronic computer device of physical world party A.

12. The method of claim 1, wherein the content of the physical world party A self-identifier includes a visual image to be displayed from the mobile electronic computer device of physical world party B.

13. The method of claim 1, wherein the content of the physical world party A self-identifier is distinguishable by a human.

14. The method of claim 1, wherein the content of the physical world party A self-identifier is indistinguishable by a human and further wherein perceiving the physical world party A self-identifier includes perceiving the physical world party A self-identifier with an electronic computer device.

15. The method of claim 1, further comprising:
erasing records of interactions between virtual world persona A and virtual world persona B on each of the electronic computer device of physical world party A and the mobile electronic computer device of physical world party B.

16. The method of claim 15, wherein erasing records occurs upon physical world party A activating an erase function on the electronic computer device of physical world party A.

17. The method of claim 15, wherein erasing records occurs automatically after a fixed time elapses subsequent to display of the physical world party A self-identifier on the electronic computer device of physical world party A.

18. The method claim 1, wherein the computer network is a peer-to-peer computer network and wherein transmitting the physical world party A self-identifier to the mobile electronic computer device of persona B includes transmitting the physical world party A self-identifier from the electronic computer device of physical world party A directly to the mobile electronic computer device of physical world party B.

19. The method of claim 1, further comprising:
receiving a physical world party B self-identifier on the electronic computer device of persona A, content of the physical world party B self-identifier previously unknown to physical world party A;
projecting the physical world party B self-identifier in a manner that is perceivable by physical world party B to enable physical world party B to identify physical world party A as associated with virtual world persona A.

20. The method of claim 19, further comprising:
authorizing display of the physical world party B self-identifier by the electronic computer device of physical world party A, content of the physical world party B self-identifier being unknown to physical world Party A prior to receipt of the physical world party B self-identifier by the electronic computer device of physical world Party A and display of the physical world party B self-identifier by the electronic computer device of physical world party A.

* * * * *